(12) United States Patent
Shoji et al.

(10) Patent No.: US 12,510,669 B2
(45) Date of Patent: Dec. 30, 2025

(54) LASER SCANNER APPARATUS AND METHOD OF OPERATION

(71) Applicant: Omron Corporation, Kyoto (JP)

(72) Inventors: Takeshi Shoji, Kyoto (JP); Yoshiharu Tani, Kyoto (JP); Adam Sowul, Pleasanton, CA (US); Fred Schleifer, Spencer, NY (US)

(73) Assignee: OMRON CORPORATION, Kyoto (JP)

( * ) Notice: Subject to any disclaimer, the term of this patent is extended or adjusted under 35 U.S.C. 154(b) by 1013 days.

(21) Appl. No.: 17/582,653

(22) Filed: Jan. 24, 2022

(65) Prior Publication Data

US 2022/0236412 A1    Jul. 28, 2022

Related U.S. Application Data

(60) Provisional application No. 63/141,535, filed on Jan. 26, 2021.

(51) Int. Cl.
*G01S 17/10* (2020.01)
*G01S 7/481* (2006.01)
*G01S 7/4865* (2020.01)

(52) U.S. Cl.
CPC ............ *G01S 17/10* (2013.01); *G01S 7/4816* (2013.01); *G01S 7/4817* (2013.01); *G01S 7/4865* (2013.01)

(58) Field of Classification Search
None
See application file for complete search history.

(56) References Cited

U.S. PATENT DOCUMENTS

| | | | |
|---|---|---|---|
| 6,915,249 B1* | 7/2005 | Sato | G06F 30/367 |
| | | | 379/22 |
| 2018/0164440 A1 | 6/2018 | Fried et al. | |
| 2019/0018143 A1 | 1/2019 | Thayer et al. | |
| 2020/0200903 A1* | 6/2020 | Singer | G05D 1/0088 |
| 2020/0217960 A1 | 7/2020 | Hicks et al. | |
| 2020/0284883 A1 | 9/2020 | Ferreira et al. | |

* cited by examiner

*Primary Examiner* — Walter L Lindsay, Jr.
*Assistant Examiner* — Geoffrey T Evans
(74) *Attorney, Agent, or Firm* — Murphy, Bilak & Homiller, PLLC (57) ABSTRACT

A laser scanner apparatus emits a laser pulse and monitors for pulse reflections, with the relative timing of a reflected pulse detected by the apparatus being translated into an object distance according to Time-of-Flight (ToF) measurements performed by the apparatus. According to an example configurations or an example method of operation, the apparatus adjusts its ToF determination for reflected pulses that are characterized as merged pulses formed by two or more overlapping reflected pulses. Among other advantages, the adjusted ToF determination yields a more accurate distance determination with respect to the earliest-arriving one(s) among the overlapping reflected pulses.

24 Claims, 5 Drawing Sheets

LASER SCANNER APPARATUS AND METHOD OF OPERATION

TECHNICAL FIELD

Various embodiments of a laser scanner apparatus and method for operating a laser scanner apparatus are disclosed herein.

BACKGROUND

A typical laser scanner apparatus, or simply "apparatus," transmits a laser pulse into a surrounding physical environment and detects one or more "reflection" pulses, as backscattered from one or more objects in the surrounding environment. By way of example, an apparatus may "sweep" a defined angular range within a horizontal plane, e.g., 180 degrees, or it may sweep through defined horizontal and vertical ranges, emitting one or more laser pulses at each angular step and correspondingly monitoring for the reception of backscattered light. Monitoring for return reflections with respect to each transmission of a laser pulse may be confined to an interval corresponding to minimum and maximum detection distances of the apparatus—i.e., a working "detection" range"-according to time-of-flight (ToF) principles.

An example apparatus includes a transmitter arrangement operative to emit laser pulses and a receiver arrangement operative to detect corresponding backscattered light. For example, the apparatus includes a photodetector that outputs a photodetector signal that varies responsive to backscattered light impinging on the photodetector, such that reflected pulses received by the apparatus manifest themselves as signal pulses in the photodetector signal. That is, the signal waveform exhibited by the photodetector signal manifests pulses corresponding to the reflection pulses impinging on the photodetector.

Accordingly, the detection of objects within a scanning range of the apparatus comprises emitting a laser pulse and monitoring the photodetector signal for signal pulses representative of the return reflections—the reflected pulses. Determining the temporal offset—the timewise location—of such signal pulses in relation to the transmission time of the outgoing laser pulse allows the apparatus to estimate object distance, according to ToF calculations. Here, ToF refers to the time from laser-beam transmission to the detection of a corresponding signal pulse (or pulses if multiple reflections are received) in the photodetector signal.

As recognized herein, challenges arise not only from the inherently high measurement speeds involved in determining the ToF of a laser pulse, but also from waveform complexities associated with overlapping reflected pulses. The overlap problem arises, for example, when two or more objects that are closely spaced along the beam direction are illuminated by the same laser pulse.

SUMMARY

A laser scanner apparatus emits a laser pulse and monitors for pulse reflections, with the relative timing of a reflected pulse detected by the apparatus being translated into an object distance according to Time-of-Flight (ToF) measurements performed by the apparatus. According to an example configuration or an example method of operation, the apparatus adjusts its ToF determination for reflected pulses that are characterized as merged pulses formed by two or more overlapping reflected pulses. Among other advantages, the adjusted ToF determination yields a more accurate distance determination with respect to the earliest-arriving one(s) among the overlapping reflected pulses.

A method of operation by a laser scanner apparatus includes, in one or more embodiments, transmitting a laser pulse from the laser scanner apparatus, detecting a reflected pulse corresponding to the laser pulse, and classifying the reflected pulse either as a single pulse or as a merged pulse containing overlapping signal pulses, in dependence on evaluating one or more attributes of the reflected pulse. The method further includes, responsive to the single-pulse classification, determining a ToF of the laser pulse according to a first ToF algorithm used by the laser scanner apparatus, or, responsive to the merged-pulse classification, determining the ToF according to a second ToF algorithm used by the laser scanner apparatus, the second ToF algorithm compensating for characteristically wider pulse widths of merged pulses as compared to single pulses.

In another example embodiment, a laser scanner apparatus includes an optical transmitter arrangement configured to transmit a laser pulse from the laser scanner apparatus, and an optical receiver arrangement configured to detect a reflected pulse corresponding to the laser pulse. Processing circuitry included in or associated with the optical receiver arrangement is configured to classify the reflected pulse either as a single pulse or as a merged pulse containing overlapping signal pulses, in dependence on evaluating one or more attributes of the reflected pulse. Responsive to the single-pulse classification, the processing circuitry determines a ToF of the laser pulse according to a first ToF algorithm used by the laser scanner, or, responsive to the merged-pulse classification, the processing circuitry determines the ToF according to a second ToF algorithm. Among other things, the second ToF algorithm compensates for characteristically wider pulse widths of merged pulses as compared to single pulses.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
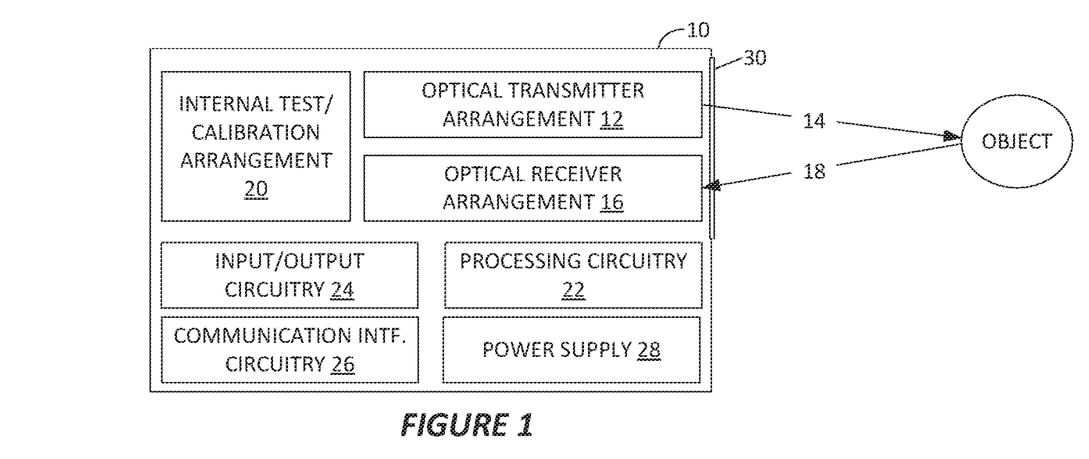
FIG. 1 is a block diagram of one embodiment of a laser scanner apparatus.

FIG. 1 depicts an example laser scanner apparatus 10, which may also be referred to as "apparatus 10" or "scanner 10." In at least one example, the apparatus 10 determines distances to objects detected in its surrounding physical environment, based on the Time-of-Flight (ToF) principle, according to which the apparatus 10 measures the time elapsed between its transmission of a laser beam into the environment and its detection of the return reflection(s). Laser-beam transmission comprises, for example, the transmission of a laser pulse, with the corresponding return "reflection" being a reflection pulse.

The reflections(s) received by the apparatus 10 are backscattered light from the object(s) illuminated by the transmitted laser pulse. Detecting the reflected pulses comprises, for example, monitoring a photodetector signal output by a photodetector of the apparatus 10 over an interval referenced to the transmission event, detecting signal pulse(s) within the monitored photodetector signal, and determining an elapsed time between the transmission event and the occurrence(s) of the detected signal pulses. "Detection" in this regard may involve relatively complex filtering and waveform processing, for rejection of noise, separation of closely-spaced reflections, etc.

Casting the above operations against the implementation details of the example apparatus 10 depicted in FIG. 1, the apparatus 10 includes an optical transmitter arrangement 12 that is configured to transmit a laser pulse 14 outward into its surrounding environment. Assuming the transmitted laser pulse 14 strikes a reflective object that falls within the detection capabilities of the apparatus 10 in terms of object size, reflectivity, and distance from the apparatus 10, an optical receiver arrangement 16 of the apparatus 10 receives backscattered light comprising one or more return reflections, also referred to as "return pulses" or "reflected pulses" 18. Generally, the optical receiver arrangement 16 of the apparatus 10 receives only a portion of the light backscattered by the object, thus the return pulses 18 detected by the apparatus 10 are backscattered light incoming to the optical receiver arrangement 16.

Further elements of the example apparatus 10 include an internal test/calibration arrangement 20, which may include one or more types of reflective targets and associated circuitry within the apparatus 10. The apparatus 10 uses such an arrangement to verify ongoing detection capabilities of the apparatus 10. e.g., for use of the apparatus 10 in safety-critical monitoring applications, such as where the apparatus 10 scans a two-dimensional area or a three-dimensional volume, for safety-critical object intrusions.

Other example elements include processing circuitry 22, input/output (I/O) circuitry 24, and communication interface circuitry 26. The processing circuitry 22 comprises fixed circuitry, programmatically-configured circuitry, or some combination of both. Example processing circuitry includes any one or more of Field Programmable Gate Arrays (FPGAs). Complex Programmable Logic Devices (CPLDs), Application Specific Integrated Circuits (ASICs), System-on-a-Chip (SoC) modules. Digital Signal Processors (DSPs), microcontrollers, or microprocessors.

In at least some embodiments, the processing circuitry 22 includes or is associated with one or more types of computer-readable media used for storing one or both of configuration data, operating logs, and computer-program instructions, the execution of which at least partially configures the apparatus 10 to operate in the manner(s) described herein. Example types of computer-readable media include any one or more of volatile memory for program execution and non-volatile memory for longer-term storage of program instructions, configuration data, etc. Examples of volatile memory include SRAM or DRAM, and examples of non-volatile memory include FLASH, EEPROM, or Solid-State Disk (SSD). Other types of memory or storage may, of course, be used.

I/O circuitry example include solid-state or mechanical ("dry") relay outputs, e.g., for gating power to machinery, triggering external events, activating alarms, activating visual or audible annunciators, etc. Examples of the communication interface circuitry 26 include network interface cards (NICs), such as for Ethernet or other data-networking protocols. The communication interface circuitry 26 may implement more than one physical interface and more than one set or type of communication protocols, depending upon operational requirements, factory-floor network types, etc. Similarly, the power supply 28 comprises, for example, an AC/DC converter that receives mains power and provides the various DC voltages needed within the apparatus 10. Of course, other power-supply configurations are contemplated.

The apparatus 10 may be housed in a dustproof and splash-resistant housing, to prevent contamination of its optical components and may include an optical window 30 for emitting laser pulses 14 and receiving backscattered light 18. After passing through any such window 30, the backscattered light 18 "enters" the optical receiver arrangement 16, which includes an optical receive path.

Figure 2:
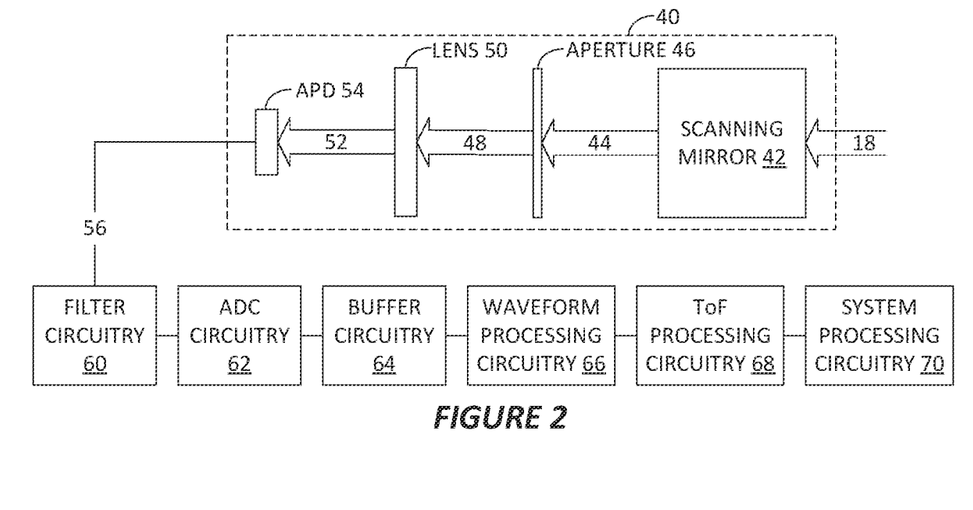
FIG. 2 is a block diagram of example details for a laser scanner apparatus, according to one embodiment.

FIG. 2 illustrates example details for an optical receive path 40, with the example arrangement including a scanning mirror 42 that is configured to project the backscattered light 18 as a projected beam 44, towards an aperture 46. The scanning mirror 42 may be used by the apparatus 10 to "scan" a corresponding range of vertical and/or azimuthal angles, by emitting laser pulses 14 at finely stepped angular positions and monitoring for corresponding return reflections at each angular position.

The projected beam 44 passes completely or partly through the aperture 46, such that the amount of backscattered light 48 that impinges on a lens 50 depends on whether or to what extent the projected beam 44 is blocked by the aperture 46. Correspondingly, the backscattered light 48 that impinges on the lens 50 is focused towards a photodetector 54 of the apparatus 10, as focused light 52. In at least one embodiment, the photodetector 54 is an avalanche photodiode, which is denoted in FIG. 2 as an "APD."

A photodetector signal 56 output from the photodetector 54 is an electrical signal that responds to backscattered light impinging on the active surface of the photodetector. In at least one embodiment, the photodetector signal 56 is an analog electrical signal that increases in amplitude in proportion to the optical power received at the active surface of the photodetector 54. Return reflections of the transmitted laser pulse 14 that are received at the apparatus 10 as backscattered light 18 are manifested in the photodetector signal 56 as signal pulses having peak amplitudes corresponding to the peak optical power impinging on the photodetector 54.

One transmitted laser pulse 14 may produce multiple reflections, and the photodetector signal 56 may exhibit multiple signal pulses over the interval of interest, along with spurious movements and other noise. In instances where a single laser-pulse transmission results in multiple return reflections arriving as backscattered light 18, the temporal separation between the corresponding signal pulses manifested in the photodetector signal 56 depends on the proximity of the reflecting objects to one another, along the beam direction. For example, closely-spaced objects that are both illuminated by the same transmitted laser pulse may produce return reflections that temporally overlap, resulting in what is referred to herein as a "merged pulse."

Filter circuitry 60 provides noise rejection and bandwidth limiting of the photodetector signal 56, in advance of analog-to-digital converter (ADC) circuitry 62, which outputs a series of digital samples over the interval of interest, for temporary storage in a buffer circuitry 64. Waveform processing circuitry 66 evaluates the series of digital samples held in the buffer circuitry 64, e.g., for peak detection and corresponding pulse identification. ToF processing circuitry 68 performs ToF calculations, using the temporal position(s) of the detected pulse(s) within the series of digital samples, and system processing circuitry 70 responds to the ToF determinations, e.g., by carrying out various actions in dependence on whether an object was detected or at what distance. Such operations may include qualification operations, for more reliable detection, and may be repeated at high speed over one or more angular scanning ranges.

The processing circuitry 22 in one or more embodiments includes the waveform processing circuitry 66 and the ToF processing circuitry 68 and may further include the system processing circuitry 70. For example, a portion of the processing circuitry 22 comprises dedicated high-speed circuitry, such as one or more FPGAs, which operate as the waveform processing circuitry 66 and/or the ToF processing circuitry 68. Other portions of the processing circuitry 22 may comprise, for example, one or more microprocessors or microcontrollers that are programmatically configured to provide overall runtime control of the apparatus 10, and to provide the desired behaviors regarding object detection, etc.

Figure 3:
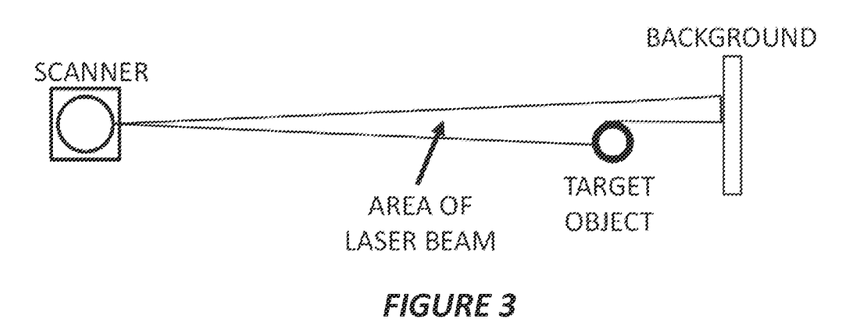
FIGS. 3 and 4 are diagrams of example scenarios resulting in "merged pulses" being received by a laser scanner apparatus.
Figure 4:
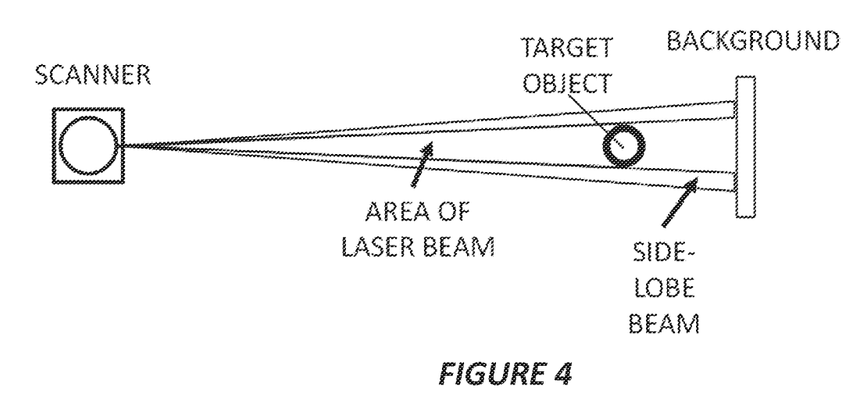

FIGS. 3 and 4 depict example scenarios in which the apparatus 10 may experience a "merged pulse" event. FIG. 3 involves a target object that is proximate to a "background," where the relative angle and positioning of the target object results in a portion of a laser beam emitted by the apparatus 10 striking the target object, with a remaining portion of the laser beam passing by the target object and striking the background. As such, the apparatus 10 may receive return reflections from both the background and the target object and those reflections may be overlapping in time, in dependence upon the depth separation of the target object and the background, along the direction of beam travel. In this context, the laser beam is an emitted laser pulse 14 and the overlapping return reflections constitute the received backscattered light 18, as shown in FIG. 1.

FIG. 4 illustrates another example where the apparatus 10 may experience a merged pulse. Here, the laser beam strikes a target object that is close to a background object. Because the laser beam deviates from the ideal case, there may be enough optical power in the sidelobes of the laser beam to produce return reflections from the background. Consequently, the apparatus 10 may receive reflections associated with backscattering of the main beam and the sidelobes. Again, whether these reflections are separated or overlapping in time depends on the distance between the target object and the background. "Target" as applied to the word "object" does not necessarily denote any specific kind of object, with the word instead serving as a label for an object detected by the apparatus 10. However, "target object" does generally refer to objects that are not part of the fixed "background" surrounding the apparatus 10.

Figure 5:
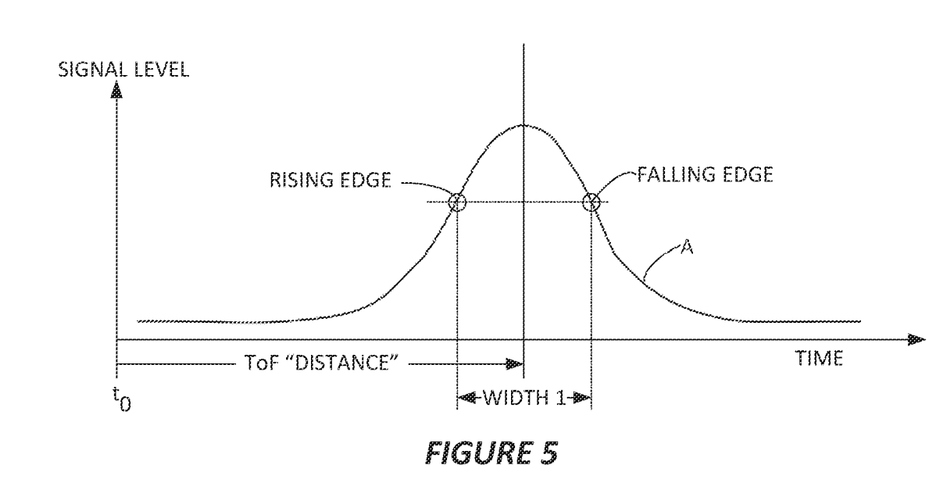
FIG. 5 is a plot of an example single or "normal" reflection pulse and a corresponding Time-of-Flight (ToF) measurement.

FIG. 5 is a plot of an example signal waveform manifested in the photodetector signal 56 of the apparatus 10, in correspondence with a reflection pulse impinging on the photodetector 54 of the apparatus 10. The plot suggests that the photodetector signal 56 includes only one signal pulse over the interval of interest, but in actual operation the photodetector signal 56 may include multiple signal pulses. What is of interest here is the fact that the depicted signal pulse is a normal, clean pulse that is not timewise overlapped by any other signal pulses.

ToF determinations for clean signal pulses comprise, for example, the apparatus 10 identifying the signal pulse by performing an initial peak detection and then determining the pulse width based on detecting the rising and falling edges of the signal pulse, and then determining the temporal "distance" between transmission of the laser pulse 14 and the middle of the reflection pulse, which may be a calculated midpoint of the reflection pulse or the detected peak value of the reflection pulse.

Rising-edge and falling-edge detection for the reflection pulse may, for example, be based on the apparatus 10 identifying as the rising edge the point within the signal pulse at which the amplitude crosses a defined threshold. The falling edge may be identified as the point within the signal pulse at which the amplitude falls back below that threshold (or another threshold). The threshold(s) used to detect the rising and falling edges may be fixed or may be scaled as a function of peak amplitude of the signal pulse.

Figure 6:
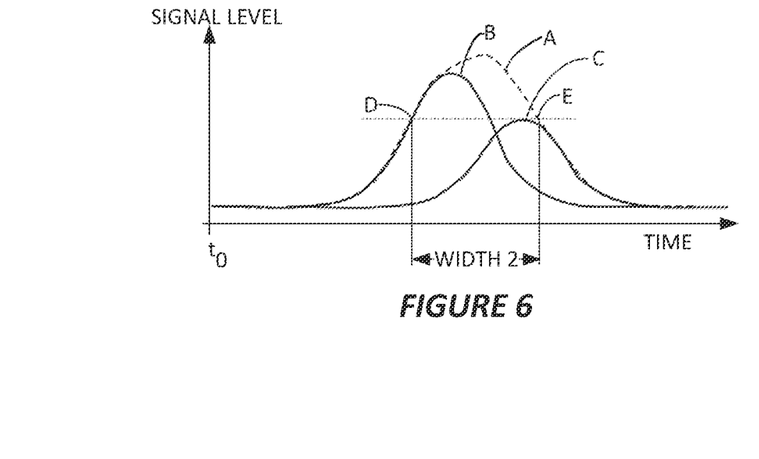
FIG. 6 is a plot of an example a "merged" pulse containing more than one overlapping reflection pulse.
Figure 7:
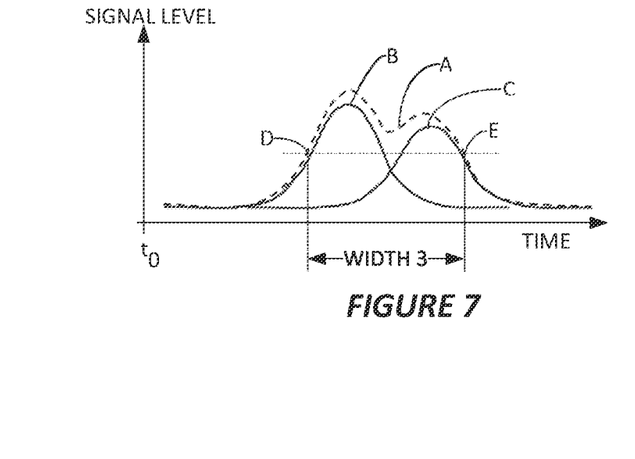
FIG. 7 is a plot of another example of a merged pulse.

FIGS. 6 and 7 illustrate merged-pulse examples that contrast with the clean, single-pulse scenario of FIG. 5. The examples suggest some of the challenges that arise in making accurate ToF determinations with respect to merged pulses, which comprise two or more overlapping signal pulses caused by overlapping return reflections impinging on the photodetector 54.

In FIG. 6, "A" depicts the photodetector signal—i.e., the actual waveform or envelope of the photodetector signal 56-"B" denotes a first one of the signal pulses contained within the merged pulse, "C" denotes a second signal pulse contained within the merged pulse, and "D" and "E" denote the rising and falling edges of the merged pulse, as detected by the apparatus 10. The signal waveform A is a superposition of the B and C signal pulses.

FIG. 7 illustrates another example merged-pulse scenario, where the letters A, B, C, D, and E, all have the same meanings as described for FIG. 6. Here, however, the merged pulse exhibits two signal peaks. As a general proposition, the apparatus 10 exploits the fact that merged pulses will, in general, have one or more pulse attributes that distinguish from the corresponding single-pulse attributes—i.e., from non-merged pulses. For example. FIGS. 6 and 7 illustrate that, in comparison to the single-pulse scenario of FIG. 5, a merged pulse may have a characteristically greater pulse width than a single pulse and/or may exhibit more than one peak.

The pulse widths. "WIDTH 2" and "WIDTH 3," for the merged pulses depicted in FIGS. 6 and 7, respectively, may be greater than the pulse width. "WIDTH 1," of the single pulse depicted in FIG. 5. Of course, not every single pulse will have the exact same width, nor will every merged pulse have the exact same width. Rather, the point is that single pulses will have widths that fall within a characteristic range or that otherwise do not exceed some maximum defined pulse width, such that signal pulses falling outside that characteristic range or exceeding that maximum may be recognized as merged pulses. Similarly, signal pulses characteristically have only one signal peak, meaning that signal pulses exhibiting more than one local peak between the detected rising and falling edges may be recognized as merged pulses. Advantageously, the apparatus 10 contemplated herein provides "compensation" for its ToF determinations, in the context of merged pulses. The compensation accounts for the distorted shapes associated with merged pulses.

Accordingly, in one or more embodiments, the laser scanner apparatus 10 includes an optical transmitter arrangement 12 configured to transmit a laser pulse 14 from the laser scanner apparatus 10. The laser pulse 14, also referred to as the laser beam 14, has a characteristic beam size/profile and duration, and the apparatus 10 further includes an optical receiver arrangement 16 that is configured to detect a reflected pulse corresponding to the laser pulse. Again, with reference to FIG. 1, the reflected pulse is backscattered light 18 received at the apparatus 10 in correspondence to transmission of the laser pulse 14 by the apparatus 10.

The apparatus 10 includes processing circuitry 22 that is included in or associated with the optical receiver arrangement 16 and is configured to classify the reflected pulse either as a single pulse or as a merged pulse containing overlapping signal pulses, in dependence on evaluating one or more attributes of the reflected pulse.

Note that the photodetector signal 56 may, with respect to the emission of any given laser pulse 14, exhibit multiple separate pulses corresponding to reflections arriving at different times, and the apparatus 10 may perform the single-pulse versus merged-pulse evaluation for each such pulse. That is, the apparatus 10 may identify several temporally distinct signal pulses based on detecting respective pairs of rising and falling edges, and then may evaluate whether each such pulse is a single pulse or a merged pulse, based on evaluating the distance between the respective pair of rising and falling edges and/or evaluating the number of localized peaks (or inflection points) between the rising and falling edges.

Responsive to the single-pulse classification for a given signal pulse, the processing circuitry 22 determines a time-of-flight (ToF) of the laser pulse 14 according to a first ToF algorithm used by the apparatus 10. However, responsive to the merged-pulse classification, the processing circuitry 22 determines the ToF according to a second ToF algorithm, the second ToF algorithm compensating for characteristically wider pulse widths of merged pulses as compared to single pulses.

As such, the processing circuitry 22 is configured to perform its ToF determination with respect to a given signal pulse manifested within the photodetector signal 56 using either a first ToF algorithm or a second ToF algorithm, in dependence on whether the processing circuitry 22 classifies the signal pulse as being a "single" (or "normal") pulse or as being a "merged" pulse. Again, single pulses represent individual reflected laser pulses that are not temporally overlapped by other reflected laser pulses, whereas merged pulses represent an overlapping condition of two or more reflected laser pulses, such as arises when a given transmitted laser pulse 14 produces return reflections from two or more objects that are closely spaced from one another, along the direction of travel of the laser pulse 14.

Detecting the reflected pulse comprises, for example, the processing circuitry 22 being configured to detect a signal pulse in the photodetector signal 56, which signal is responsive to the backscattered light received by the apparatus 10 in conjunction with the transmission of the laser pulse 14.

Classifying the reflected pulse either as a single pulse or a merged pulse comprises, for example, the processing circuitry 22 being configured to classify the reflected pulse as a merged pulse in response to determining that a pulse width of the signal pulse exceeds a defined pulse-width threshold and classifying the reflected pulse as a single pulse in response to determining that the pulse width does not exceed the defined pulse-width threshold. Alternatively, classifying the reflected pulse either as a single pulse or a merged pulse comprises the processing circuitry 22 being configured to classify the reflected pulse as a merged pulse in response to detecting more than one peak between rising and falling edges of the signal pulse and classifying the reflected pulse as a single pulse in response to not detecting more than one peak between the rising and falling edges.

Still further, in at least one embodiment of the apparatus 10, the processing circuitry 22 is configured to evaluate both pulse width and number of peaks between rising and falling edges of a detected signal pulse, for deciding whether the signal pulse should be handled as a single pulse or as a merged pulse. For example, the processing circuitry 22 may be configured to classify a given signal pulse manifested within the photodetector signal 56 as a merged pulse, rather than as a single pulse, if either condition is satisfied: (a) more than one signal peak exists between the rising and falling edges of the signal pulse, or (b) the "distance" between the rising and falling edges of the signal pulse exceeds a defined pulse-width threshold. Here, distance refers to the progression of time along the timeline over which the apparatus 10 evaluates the photodetector signal 56 in relation to the transmission of a laser pulse 14.

In one or more embodiments, the first ToF algorithm depends on a detected width of the reflected pulse, and wherein the second ToF algorithm does not depend on the detected width of the reflected pulse. For example, referring to back to FIG. 5, which depicts a single-pulse scenario, the processing circuitry 22 determines the ToF distance from laser-pulse transmission to return-pulse reception by locating points in the signal pulse that are taken as demarking the rising and falling edges, and then determining finding the middle point between the rising and falling edges. In another variation of the first ToF algorithm's width-dependent ToF determination, the processing circuitry 22 determines the ToF distance associated with a single pulse by finding the peak signal value lying between the points in the single pulse that are taken as the rising and falling edges.

Again, the points in the signal-pulse waveform that are taken as the rising and falling edges may be determined by the processing circuitry 22 comparing the amplitude of the signal pulse to a reference amplitude, and correspondingly detecting the point at which the amplitude exceeds the reference amplitude and then detecting the later point at which the amplitude falls back below the reference amplitude. The reference amplitude may be fixed, e.g., based on the opto-electric characteristics of the apparatus 10, or may be dynamically scaled, as a function of the peak amplitude detected for the signal pulse.

As noted with respect to the ADC circuitry 62 shown in FIG. 2, for each emitted laser pulse 14, the apparatus 10 in one or more embodiments digitizes the photodetector signal 56 over an interval referenced to the transmission time of the emitted laser pulse 14. The corresponding series or sequence of digital values represents the photodetector signal 56 at successive points in time, where those points are spaced according to the sampling rate of the ADC circuitry 62. With the series of digital values held in the buffer circuitry 64, the processing circuitry 22 comprises or communicates with, for example, the waveform processing circuitry 66 and ToF processing circuitry 68 shown in FIG. 2, and it evaluates series of digital values to detect signal peaks, perform pulse-attribute evaluation for the detected peaks—at least for peaks meeting some minimum amplitude threshold—and classify each detected peak as being a single pulse or a merged pulse, based on evaluating the digital values in the surrounding region of the digitized photodetector signal.

As noted, in one or more embodiments, the first ToF algorithm comprises determining an elapsed time between the transmission time of the laser pulse 14 and a reception time corresponding to a midpoint of the reflected pulse, as determined from detected rising and falling edges of the reflected pulse. Conversely, determining the ToF according to the second ToF algorithm comprises determining an elapsed time between the transmission time of the laser pulse 14 and a reception time corresponding to a point in the reflected pulse at a programmed offset past the detected rising edge.

The word "point" in at least one embodiment refers to a particular digital value in the sequence of digital values comprising the digitized photodetector signal or refers to a particular digital value in an up-sampled sequence of digital values that is generated or calculated by the processing circuitry 22. The up-sampled sequence has a higher resolution—i.e., a smaller time increment between the successive digital values making up the digitized waveform—as compared to the sampling time of the ADC circuitry 62. "Point" may also refer to a mathematically-calculated value, such as the midpoint between two digital values of the signal waveform. Whether waveform processing of a signal pulse uses the base time resolution or higher resolution, the successive digital values correspond to successive points in time along the timeline referenced to the transmission of the involved laser pulse 14.

Performing a ToF determination for a merged pulse using the first ToF algorithm would result in an error, at least with respect to the timing of the first (earliest) reflected pulse that is represented in the merged pulse, because of the pulse shape or size distortions experienced in the merged-pulse scenario. Thus, the processing circuitry 22 dynamically switching to the second ToF algorithm in response to classifying a signal pulse as being a merged pulse offers significant operational advantages, particularly in the safety-of-design context. For example, with reference to the merged-pulse scenario depicted in FIG. 8.

Figure 8:
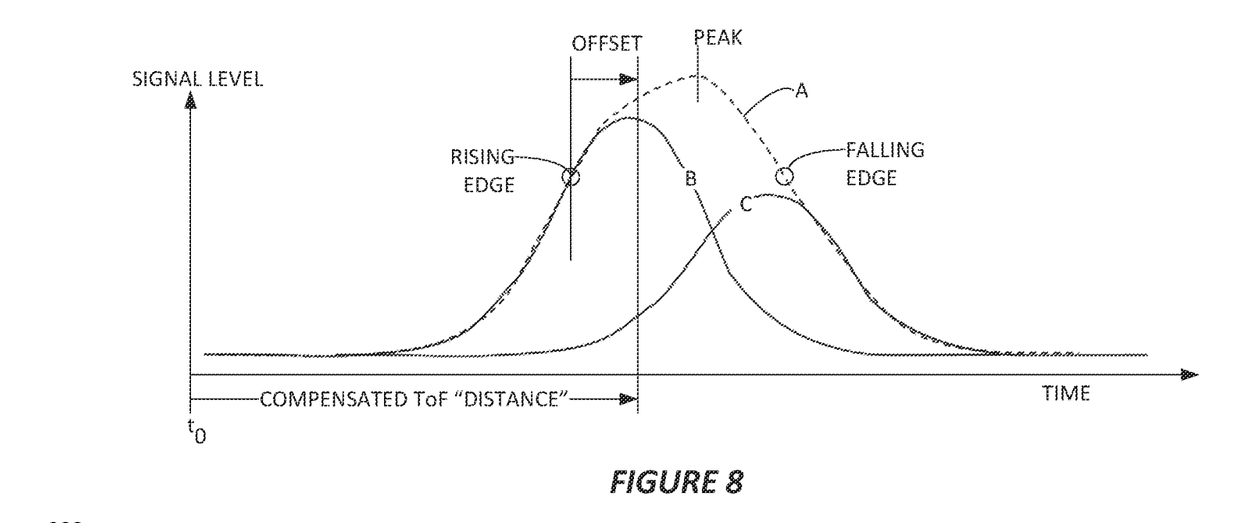
FIG. 8 is a plot illustrating a ToF compensation performed by a laser scanner apparatus for a merged pulse, according to one embodiment.

Applying the first ToF algorithm to the merged pulse depicted in FIG. 8 would result in the processing circuitry 22 identifying the pulse location as being the highest signal value (peak) lying between the rising or falling edges, or the as the midway point between the detected rising and falling edges. The thus-determined pulse location is not an accurate determination with respect to the earliest pulse-signal waveform B—meaning that the ToF determination will results in a calculated target distance that is further away from the apparatus 10 than the object that caused the reflected pulse corresponding to the signal waveform B. From a safety-of-design perspective then, the apparatus 10 might fail to take a warning or preventive action that would otherwise be triggered had the ToF determination been more accurately biased towards the signal waveform B rather than the merged-pulse waveform A.

The second ToF algorithm provides that more accurate biasing by, for example, determining the location of the merged pulse as a point lying beyond (in increasing time) the detected rising edge by a programmed offset corresponds to one-half of a nominal pulse width that is characteristic for single-pulse reflections of the laser pulse. The programmed offset may be a single, fixed value, or it may be a dynamic value that is scaled in dependence on the amplitude of the merged pulse. In either case, FIG. 8 illustrates that the "compensated ToF distance" determined via the second ToF algorithm is close to or at the midpoint of the earliest reflected pulse within the merged pulse—i.e., the signal waveform B.

Broadly, then, in one or more embodiments, the apparatus 10 evaluates a photodetector signal 56 over an interval referenced to a transmission time of any given laser pulse 14 emitted by the apparatus 10, with the reflected pulse manifested in the photodetector signal as a pulse waveform. The first ToF algorithm determines a temporal position or location of the reflected pulse within the interval as the midpoint or peak between detected rising and falling edges of the pulse waveform. Conversely, the second ToF algorithm determines the temporal position of the reflected pulse within the interval as a point in the pulse waveform that is at a defined time offset beyond the detected rising edge of the reflected pulse. By intelligently deciding when to use the second ToF algorithm rather than the first ToF algorithm, the apparatus 10 produces more accurate and reliable distance determinations in merged-pulse scenarios.

Figure 9:
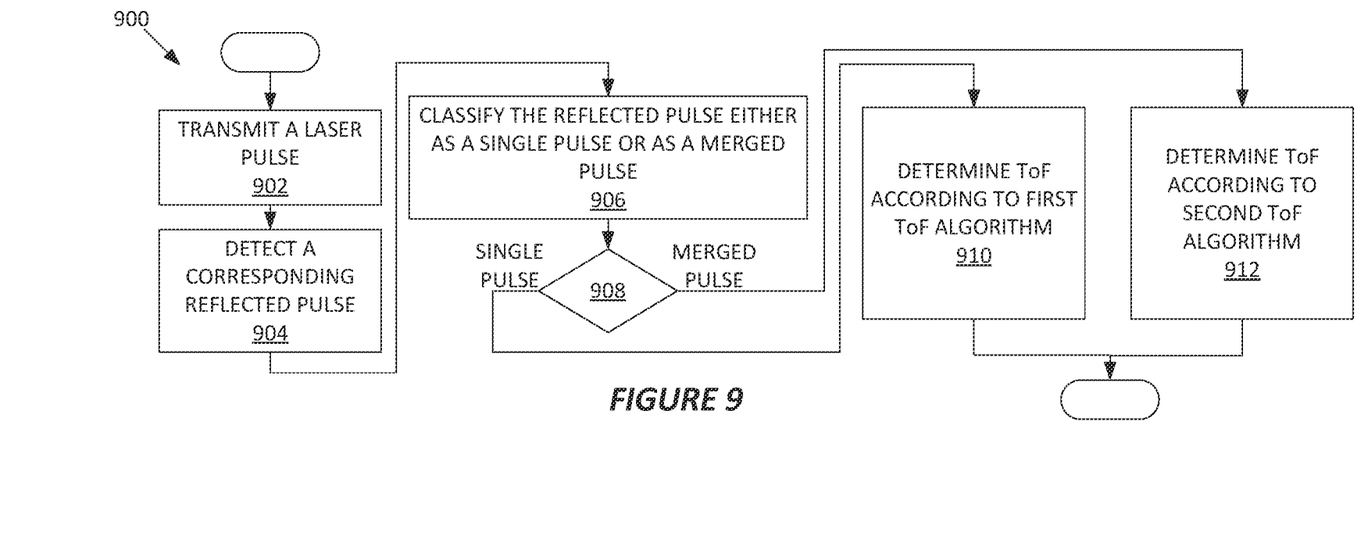
FIG. 9 is logic flow diagram of a method performed by a laser scanner apparatus, in one embodiment.

FIG. 9 illustrates one embodiment of a method 900 of operation by a laser scanner apparatus, for example, the apparatus 10 shown in FIG. 1. The method 900 includes transmitting (Block 902) a laser pulse from the apparatus, detecting (Block 904) a reflected pulse corresponding to the laser pulse, and classifying (Block 906) the reflected pulse either as a single pulse or as a merged pulse containing overlapping signal pulses, in dependence on evaluating one or more attributes of the reflected pulse.

Further, responsive to the single-pulse classification (Block-908 decision), the method 900 includes determining (Block 910) a time-of-flight (ToF) of the laser pulse according to a first ToF algorithm used by the apparatus. Alternatively, responsive to the merged-pulse classification (Block-908 decision), the method 900 includes determining (Block 912) the ToF according to a second ToF algorithm, the second ToF algorithm compensating for characteristically wider pulse widths of merged pulses as compared to single pulses.

Detecting the reflected pulse comprises, for example, detecting a signal pulse in a photodetector signal that is responsive to backscattered light received by the laser scanner apparatus in conjunction with the transmission of the laser pulse.

Classifying the reflected pulse either as a single pulse or a merged pulse comprises, for example, classifying the reflected pulse as a merged pulse in response to determining that a pulse width of the signal pulse exceeds a defined pulse-width threshold and classifying the reflected pulse as a single pulse in response to determining that the pulse width does not exceed the defined pulse-width threshold.

As another example, classifying the reflected pulse either as a single pulse or a merged pulse comprises classifying the reflected pulse as a merged pulse in response to detecting more than one peak between rising and falling edges of the signal pulse and classifying the reflected pulse as a single pulse in response to not detecting more than one peak between the rising and falling edges. In general, the laser scanner apparatus may consider one or more pulse attributes—e.g., width and/or number of peaks or other shape characteristic—for determining the pulse classification.

In one or more embodiments, the first ToF algorithm depends, for example, on a detected width of the reflected pulse, while the second ToF algorithm does not depend on the detected width of the reflected pulse. For example, determining the ToF according to the first ToF algorithm comprises determining an elapsed time between a transmission time of the laser pulse and a reception time corresponding to a midpoint of the reflected pulse, determined from detected rising and falling edges of the reflected pulse. However, determining the ToF according to the second ToF algorithm comprises determining an elapsed time between the transmission time of the laser pulse and a reception time corresponding to a point in the reflected pulse at a programmed offset past the detected rising edge.

The method 900 includes detecting the rising and falling edges of the reflected pulse using fixed signal thresholds, or using dynamic thresholds determined in dependence on the amplitude of the reflected pulse. Here, references to attributes of the reflected pulse will be understood as implicitly referring to the attributes of the signal waveform manifested in a photodetector signal because of the reflected pulse impinging on the active surface of a photodetector used by the apparatus for detecting backscattered light received by the apparatus.

In at least one embodiment, the programmed offset used by the second ToF algorithm corresponds to one-half of a nominal pulse width that is characteristic for single-pulse reflections of the laser pulse. The programmed offset may be independent of a detected amplitude of the reflected pulse or may be dependent on the detected amplitude of the reflected pulse.

In at least one embodiment of the method 900, the apparatus evaluates a photodetector signal over an interval referenced to a transmission time of the laser pulse, with the reflected pulse manifested in the photodetector signal as a pulse waveform. The first ToF algorithm determines a temporal position of the reflected pulse within the interval as the midpoint between detected rising and falling edges of the pulse waveform, and the second ToF algorithm determines the temporal position of the reflected pulse within the interval as a point in the pulse waveform that is at a defined time offset beyond the detected rising edge.

Figure 10:
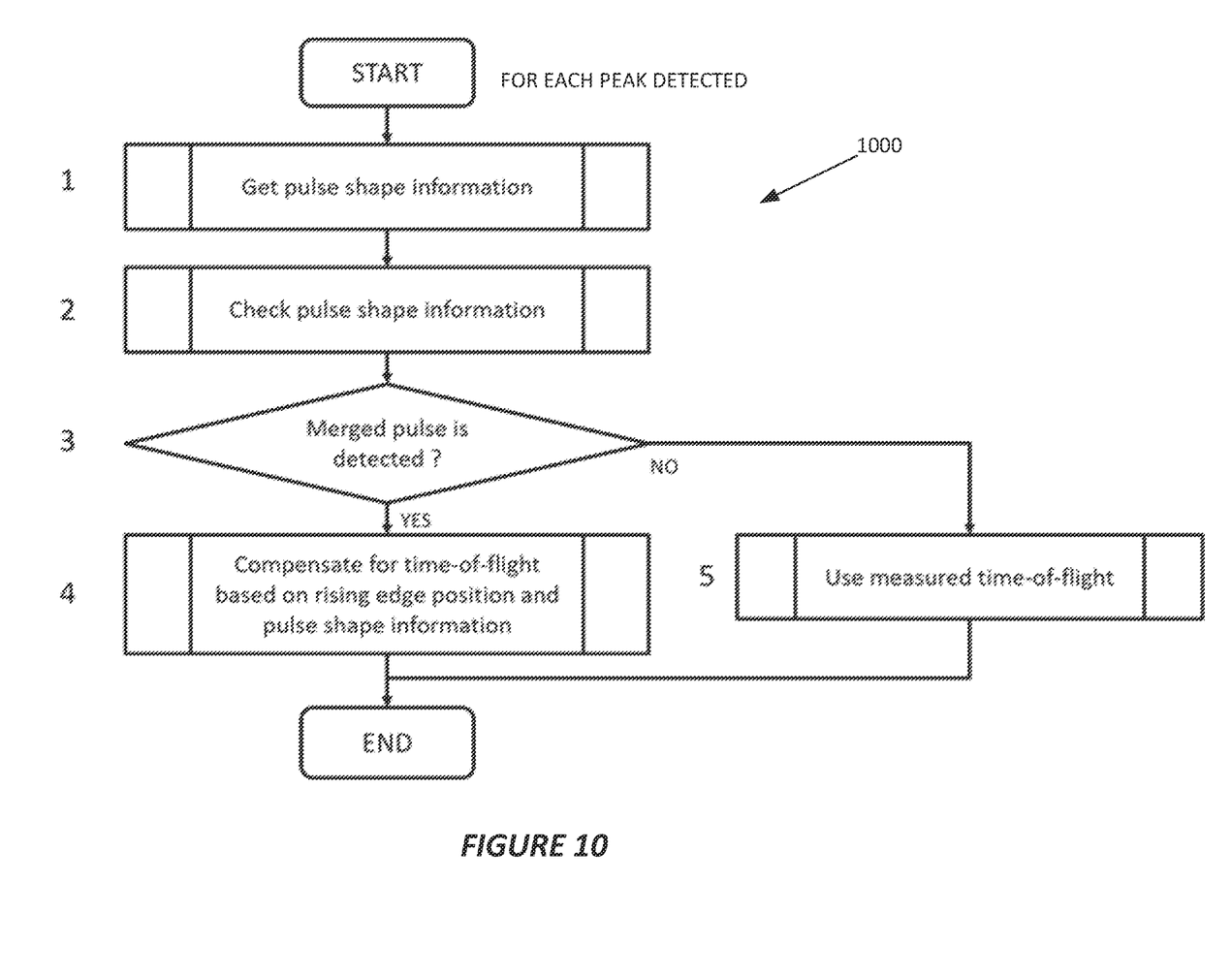
FIG. 10 is logic flow diagram of a method performed by a laser scanner apparatus, in another embodiment.

FIG. 10 illustrates another example method 1000 performed by a laser scanner apparatus, such as the apparatus 10 introduced in FIG. 1. In context, the method 1000 assumes that the apparatus emitted a laser pulse 14 and then, for each peak detected in the photodetector signal, the apparatus performs the following steps:

Step 1—"get" the pulse shape information associated with the peak, e.g., perform a waveform analysis that determines the width of the pulse in which the peak is contained and/or determines whether the peak is the only peak exhibited within the pulse.

Step 2—"check" the pulse shape information. For example, the apparatus checks whether the pulse is wider than some threshold width associated with normal, single pulses, or checks whether there is more than one localized signal peak between the rising and falling edges of the pulse. If the pulse shape information indicates the merged-pulse case (YES from Step 3), processing proceeds with Step 4, in which the apparatus compensates the ToF determination, based on the rising-edge position and the pulse-shape information.

Here, "based on the pulse-shape information" refers to, for example, determining that the pulse-shape information indicates a merged-pulse case, such that the ToF determination is adjusted, in comparison to the ToF determination that would be used in the single-pulse case. For the single-pulse case (NO from Step 3), processing advances to Step 5, where the apparatus uses the measured ToF, rather than the compensated ToF. In other words, at Step 5, the apparatus performs/uses a "normal" or "uncompensated" ToF determination that it applies in the case of single pulses.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation by a laser scanner apparatus, the method comprising:
   transmitting a laser pulse from the laser scanner apparatus;
   detecting a reflected pulse corresponding to the laser pulse;
   classifying the reflected pulse either as a single pulse or as a merged pulse containing overlapping signal pulses, in dependence on evaluating one or more attributes of the reflected pulse; and
   responsive to the single-pulse classification, determining a time-of-flight (ToF) of the laser pulse according to a first ToF algorithm used by the laser scanner apparatus; or
   responsive to the merged-pulse classification, determining the ToF according to a second ToF algorithm used by the laser scanner apparatus, the second ToF algorithm compensating for characteristically wider pulse widths of merged pulses as compared to single pulses.

2. The method of claim 1, wherein detecting the reflected pulse comprises detecting a signal pulse in a photodetector signal that is responsive to backscattered light received by the laser scanner apparatus in conjunction with the transmission of the laser pulse.

3. The method of claim 2, wherein classifying the reflected pulse either as a single pulse or a merged pulse comprises classifying the reflected pulse as a merged pulse in response to determining that a pulse width of the signal pulse exceeds a defined pulse-width threshold and classifying the reflected pulse as a single pulse in response to determining that the pulse width does not exceed the defined pulse-width threshold.

4. The method of claim 2, wherein classifying the reflected pulse either as a single pulse or a merged pulse comprises classifying the reflected pulse as a merged pulse in response to detecting more than one peak between rising and falling edges of the signal pulse and classifying the reflected pulse as a single pulse in response to not detecting more than one peak between the rising and falling edges.

5. The method of claim 1, wherein the first ToF algorithm depends on a detected width of the reflected pulse, and wherein the second ToF algorithm does not depend on the detected width of the reflected pulse.

6. The method of claim 1, wherein determining the ToF according to the first ToF algorithm comprises determining an elapsed time between a transmission time of the laser pulse and a reception time corresponding to a midpoint of the reflected pulse, determined from detected rising and falling edges of the reflected pulse, and wherein determining the ToF according to the second ToF algorithm comprises determining an elapsed time between the transmission time of the laser pulse and a reception time corresponding to a point in the reflected pulse at a programmed offset past the detected rising edge.

7. The method of claim 6, further comprising detecting the rising and falling edges of the reflected pulse using fixed signal thresholds.

8. The method of claim 6, further comprising detecting the rising and falling edges of the reflected pulse using dynamic signal thresholds referenced to a detected amplitude of the reflected pulse.

9. The method of claim 6, wherein the programmed offset corresponds to one-half of a nominal pulse width that is characteristic for single-pulse reflections of the laser pulse.

10. The method of claim 9, wherein the programmed offset is independent of a detected amplitude of the reflected pulse.

11. The method of claim 9, wherein the programmed offset is dependent on the detected amplitude of the reflected pulse.

12. The method of claim 1, wherein the laser scanner apparatus evaluates a photodetector signal over an interval referenced to a transmission time of the laser pulse, with the reflected pulse manifested in the photodetector signal as a pulse waveform, and wherein the first ToF algorithm determines a temporal position of the reflected pulse within the interval as the midpoint between detected rising and falling edges of the pulse waveform, and wherein the second ToF algorithm determines the temporal position of the reflected pulse within the interval as a point in the pulse waveform that is at a defined time offset beyond the detected rising edge.

13. A laser scanner apparatus comprising:
an optical transmitter arrangement configured to transmit a laser pulse from the laser scanner apparatus; and
an optical receiver arrangement configured to detect a reflected pulse corresponding to the laser pulse;
wherein processing circuitry included in or associated with the optical receiver arrangement is configured to:
classify the reflected pulse either as a single pulse or as a merged pulse containing overlapping signal pulses, in dependence on evaluating one or more attributes of the reflected pulse; and
responsive to the single-pulse classification, determine a time-of-flight (ToF) of the laser pulse according to a first ToF algorithm used by the laser scanner; or
responsive to the merged-pulse classification, determine the ToF according to a second ToF algorithm, the second ToF algorithm compensating for characteristically wider pulse widths of merged pulses as compared to single pulses.

14. The laser scanner apparatus of claim 13, wherein the processing circuitry is configured to detect the reflected pulse by detecting a signal pulse in a photodetector signal that is responsive to backscattered light received by the laser scanner apparatus in conjunction with the transmission of the laser pulse.

15. The laser scanner apparatus of claim 14, wherein the processing circuitry is configured to classify the reflected pulse either as a single pulse or a merged pulse by classifying the reflected pulse as a merged pulse in response to determining that a pulse width of the signal pulse exceeds a defined pulse-width threshold, or classifying the reflected pulse as a single pulse in response to determining that the pulse width does not exceed the defined pulse-width threshold.

16. The laser scanner apparatus of claim 14, wherein the processing circuitry is configured to classify the reflected pulse either as a single pulse or a merged pulse by classifying the reflected pulse as a merged pulse in response to detecting more than one peak between rising and falling edges of the signal pulse, or classifying the reflected pulse as a single pulse in response to not detecting more than one peak between the rising and falling edges.

17. The laser scanner apparatus of claim 13, wherein the first ToF algorithm depends on a detected width of the reflected pulse, and wherein the second ToF algorithm does not depend on the detected width of the reflected pulse.

18. The laser scanner apparatus of claim 13, wherein the processing circuitry is configured to determine the ToF according to the first ToF algorithm by determining an elapsed time between a transmission time of the laser pulse and a reception time corresponding to a midpoint of the reflected pulse, determined from detected rising and falling edges of the reflected pulse, and wherein determining the ToF according to the second ToF algorithm comprises determining an elapsed time between the transmission time of the laser pulse and a reception time corresponding to a point in the reflected pulse at a programmed offset past the detected rising edge.

19. The laser scanner apparatus of claim 18, wherein the processing circuitry is further configured to detect the rising and falling edges of the reflected pulse using fixed signal thresholds.

20. The laser scanner apparatus of claim 18, wherein the processing circuitry is further configured to detect the rising and falling edges of the reflected pulse using dynamic signal thresholds referenced to a detected amplitude of the reflected pulse.

21. The laser scanner apparatus of claim 18, wherein the programmed offset corresponds to one-half of a nominal pulse width that is characteristic for single-pulse reflections of the laser pulse.

22. The laser scanner apparatus of claim 21, wherein the programmed offset is independent of a detected amplitude of the reflected pulse.

23. The laser scanner apparatus of claim 21, wherein the programmed offset is dependent on the detected amplitude of the reflected pulse.

24. The laser scanner apparatus of claim 13, wherein the processing circuitry is configured to evaluate a photodetector signal over an interval referenced to a transmission time of the laser pulse, with the reflected pulse manifested in the photodetector signal as a pulse waveform, and wherein the first ToF algorithm determines a temporal position of the reflected pulse within the interval as the midpoint between detected rising and falling edges of the pulse waveform, and wherein the second ToF algorithm determines the temporal position of the reflected pulse within the interval as a point in the pulse waveform that is at a defined time offset beyond the detected rising edge.

* * * * *